Patented Oct. 23, 1945

2,387,367

UNITED STATES PATENT OFFICE 2,387,367

SILICATE BASE ADHESIVE

Charles A. Vana, Brecksville, Ohio, assignor to E. I. du Pont de Nemours & Company, Wilmington, Del., a corporation of Delaware No Drawing. Application June 30, 1942, Serial No. 449,169

4 Claims. (Cl. 260—32)

This invention relates to adhesive and coating compositions and to methods of preparing the same, and is directed particularly to compositions of silicate base adhesives having dispersed therein a small amount of a homogeneous mixture of a non-saponifiable resin and a plasticizer for said resin.

Silicate base adhesives are generally well known in the art and have wide applicability in the manufacture of paperboard, wallboard and like paper products as well as in the bonding of many other industrial articles. See, for example, Vail—Soluble Silicates in Industry—ACS Monograph #46, pp. 210–241. Although the silicate base adhesives give stiff bonds the stiffness for many purposes is undesirable and various substances, such as starch, dextrin, gum arabic, shellac, glycerine, latex, glucose and like materials, have been added to silicate base adhesives to avoid this difficulty. This object, however, is only imperfectly obtained in that the adhesive films either are not as strong as those obtained from the silicate base adhesive, unmodified, or the flexibility is not adequate, and the modified adhesive is either relatively unstable or sensitive to various conditions.

I have now discovered new and useful adhesive and coating compositions free or essentially free of the disadvantages of the prior art compositions which are characterized by having dispersed in the silicate base adhesive a small proportion of a homogeneous mixture of a coumarone-indene resin and a plasticizer for the resin. I have found further that such dispersions have unusual stability if the plasticizer is a monohydric alcohol ester compatible with sodium silicate containing at least twelve carbon atoms, having a molecular weight of at least 220, and consisting of carbon, hydrogen and oxygen.

The compositions of my invention are suitably prepared by first mixing the plasticizer and the resin together to form a homogeneous mixture, that is, a solution of one component in the other. The plasticizer preferably is in excess so that the mixture may be considered a solution of the resin in the plasticizer. A wetting agent may be included in this mixture. Then the homogeneous mixture thus obtained is added with rapid agitation to the silicate base adhesive. A suitable method and composition are illustrated in the following example, in which the parts are by weight unless otherwise specified:

*Example*

200 parts of a medium soft coumarone-indene resin having a melting point range of 35–45° C. and marketed under the name, Neville R-28, was dissolved in 500 parts of dibutyl phthalate. To this solution was added 25 parts of a wetting agent known as Igepon T, the active agent of which is understood to be the sodium salt of beta-oleylamidoethane sulfonic acid. The mixture thus obtained is added with vigorous agitation, such as obtains in a colloid mill, to 9,275 parts of a solution of sodium silicate having a specific gravity of 42.5° Baumé at 60° F. and an $SiO_2/Na_2O$ weight ratio of 3.25. The adhesive thus obtained has the following composition:

| | Per cent |
|---|---|
| Sodium silicate (42.5° Bé., 3.25 ratio) | 92.75 |
| Dibutyl phthalate | 5.0 |
| Coumarone-indene resin (Neville R-28) | 2.0 |
| Wetting agent (Igepon T) | 0.25 |

The composition thus obtained is characterized as a stable dispersion of the resin in the sodium silicate solution. Although there is a tendency for the dispersed phase to separate somewhat over long periods of standing, it can easily be re-dispersed by simply shaking.

Since this composition is predominantly a sodium silicate solution, the adhesive composition has all the advantages of silicate adhesives. It is, however, superior to simple silicate adhesives due to its film characteristics.

The composition described above is useful in applications requiring flexible films and waterproof characteristics. Thus the composition may be used as a surface coating for paper, for greaseproofing or other purposes, or for special adhesive problems. One of the short-comings of silicate as a grease-resistant coating on paper is that the film is brittle and breaks on bending or folding so that at the break the grease-resistance is not appreciably greater than the original paper. This objection can be minimized or avoided with the composition described in the above example. Likewise, special adhesive problems are presented in adhering cloth to fiber backing, as for example in automobile glove compartments, in making reenforced laminated wrapping paper, and in making flexible fiber abrasive and polishing discs.

Advantages are obtained in all these and related applications by virtue of the superior film characteristics of my composition. The film formed is more flexible and has a higher degree of waterproofness than straight silicate base adhesives and still possesses the inherent advantages of sodium silicate as an adhesive.

The dibutyl phthalate appears to serve at least two functions in the composition. First, it contributes to the production of a flexible film and, second, it acts as a stabilizer for the resin in the dispersion. This is wholly an unexpected property of the plasticizer because without the plasticizer the resins are difficult to disperse in the silicate solutions.

Compositions not containing the plasticizer are relatively unstable in that the resin has a tendency to agglomerate and rise to the surface of the silicate solution in which condition it is redispersed only with difficulty.

While I have described my invention with reference to a particular composition and method it will be understood that variations as to the constituents, concentrations, proportions and other variables may be made without departing from the spirit of the invention.

In formulating the compositions of my invention I may use any silicate solution suitable for use as an adhesive. These are generally well known in the art, Vail, supra. Hence, when I speak of "silicate base adhesives" I have reference to such silicate solutions and mean to include those silicate solutions having an $$SiO_2/Na_2O$$

weight ratio from 2 to 4 and a specific gravity of from 30 to 60° Baumé (25 to 55% solids). The specific gravity is determined by the viscosity requirements of the particular application. For some purposes the adhesive needs to be more viscous than for others. Also, in the coating of paper, whether for grease-proofing or laminating, the speed of application is a determinative factor. The faster the web passes the applicator the more fluid the adhesive must be.

The silicate base adhesive may be modified by inert materials such as clay, fuller's earth and other siliceous products, according to the practices well known in the art. The products made with such materials containing plasticized resins as described herein have the same superior characteristics in regard to stability of the dispersion, flexibility of the film formed and resistance of the film to water.

The resins most suitable for use in the compositions of my invention are the coumarone-indene resins. These resins have a high resistance to alkali, they are non-saponifiable and inert in the sodium silicate. The coumarone-indene resins vary widely in their physical properties according to the method of their preparations, ranging from hard and brittle varnish grade resins to soft resins. Those skilled in the art who are familiar with the various methods of preparation and with the grading and classification of the products will be capable of selecting suitable grades for use in the present invention. Ordinarily those having a melting range below 95° C. are most suitable, but those of higher melting range may be used especially if a larger proportion of plasticizer is used.

Having in mind the particular characteristics of the resin, any plasticizer compatible with sodium silicate, that is, which neither gels the silicate nor is hydrolyzed thereby, may be used. Plasticizers for the resins useful in the invention are generally well known in the art; any which are solvent for or in the resin and are compatible with the silicate may be used. Dibutyl phthalate is highly satisfactory. It not only plasticizes but also stabilizes the dispersion. Other monohydric alcohol esters compatible with sodium silicate having a molecular weight of at least 220, having at least twelve carbon atoms and consisting of carbon, hydrogen and oxygen, such as diethyl phthalate, butyl acetyl ricinoleate and butyl stearate are similarly effective in that they yield films of superior flexibility and impart superior stability to the dispersion. While other plasticizers which do not have this stabilizing property may be employed, they are not desirable.

To impart optimum film-forming properties it is desirable to include a small amount of a wetting agent. Suitable types are represented by sodium beta(oleyl-N-methyl amido) ethane sulfonate, sodium octyl sulfate, sodium 8-pentadecyl sulfate and sodium hexadecyl sulfate. Having in mind that the silicates are alkaline and that the wetting agent must be stable in alkaline solution, those skilled in the art will be able to select suitable wetting agents.

The proportions of the several constituents may be varied, but it should be borne in mind that the quantity of resin is critical in that too much destroys the strength of the silicate bond. Suitably the resin content of the dispersion may range up to around 5% without deleteriously affecting the composition. Around 2 per cent appears most suitable and smaller quantities may be used. Very small quantities may effect the advantages of the invention in some degree but they are not pronounced in quantities less than 0.5 per cent. The plasticizer may range from around 1 to 12 per cent. Five per cent is suitable, especially with 2 per cent resin. Preferably the plasticizer should be substantially in excess of the resin, that is, the discontinuous phase of the dispersion should be a solution of the resin in the plasticizer. The amount of wetting agent may vary from around 0.10 to 0.50, 0.25 being suitable. Inorganic materials may be included in amounts customary in the art.

I claim:

1. An adhesive and coating composition consisting in a silicate base adhesive having dispersed therein a homogeneous mixture of a coumarone-indene resin and a plasticizer for said resin in the proportions of 0.5–5.0 per cent resin, 1–12 per cent plasticizer and the balance substantially said silicate base adhesive, said silicate base adhesive comprising an aqueous sodium silicate solution having a specific gravity of about 30 to 60° Baumé and an $SiO_2/Na_2O$ weight ratio of about 2 to about 4.

2. An adhesive and coating composition consisting in a silicate base adhesive having dispersed therein a small amount of a solution of a coumarone-indene resin in dibutyl phthalate, said silicate base adhesive comprising aqueous sodium silicate having a specific gravity of 30 to 60° Baumé and an $SiO_2/Na_2O$ weight ratio of about 2 to about 4, and the proportions being about 0.5–5 per cent resin, 1–12 per cent dibutyl phthalate, and the balance substantially said aqueous silicate solution.

3. A composition of matter consisting in an aqueous solution of sodium silicate having a specific gravity of 30 to 60° Baumé and an $SiO_2/Na_2O$ weight ratio of about 2 to about 4, having dispersed therein a homogeneous mixture of a coumarone-indene resin and a plasticizer for said resin in the amounts of about 0.5–5 per cent resin and about 1–12 per cent plasticizer, and a small amount of a wetting agent.

4. The method which comprises dissolving a coumarone-indene resin in a plasticizer for said resin characterized as a monohydric alcohol ester having at least 12 carbon atoms, a molecular weight of at least 220, and by being composed of carbon, hydrogen and oxygen, and dispersing said solution in an aqueous solution of sodium silicate having a specific gravity of 30 to 60° Baumé and an $SiO_2/Na_2O$ weight ratio of about 2 to about 4 in the proportions of a resin content of about 0.5–5 per cent.

CHARLES A. VANA.